United States Patent [19]
Onnagawa et al.

[11] Patent Number: 6,075,582
[45] Date of Patent: Jun. 13, 2000

[54] LCD WITH ZIG-ZAG ELECTRODES ON BOTH SUBSTRATES

[75] Inventors: Hiroyoshi Onnagawa; Hiroyuki Okada; Masashi Ishimaru, all of Toyama, Japan

[73] Assignee: Chisso Corporation, Osaka, Japan

[21] Appl. No.: 09/296,559

[22] Filed: Apr. 22, 1999

[51] Int. Cl.[7] ...................... G02F 1/1343; G02F 1/1335
[52] U.S. Cl. ............................ 349/145; 349/96; 349/139
[58] Field of Search ................................... 345/145, 146, 345/96, 117, 142, 139

[56] References Cited

U.S. PATENT DOCUMENTS

| | | | |
|---|---|---|---|
| 4,335,937 | 6/1982 | Takamatsu et al. | 349/145 |
| 4,373,784 | 2/1983 | Nonomura et al. | 349/145 |
| 4,636,817 | 1/1987 | Makasaki | 349/145 |
| 4,838,657 | 6/1989 | Miura et al. | 349/145 |

OTHER PUBLICATIONS

"LP–G: Late–News Poster: Hybrid Switching Mode for Wide–Viewing Angle TFT–LCD's," H.H. Shin, et al. SID International Symposium Digest of Technical Papers, col. XXIX, pp 718–721.

"A Novel Wide Viewing Angle Technology for AM_LCDs," Kim, et al. IDW Proceedings of the Fourth International Display Workshops, pp. 175–178.

Primary Examiner—William L. Sikes
Assistant Examiner—Toan Ton
Attorney, Agent, or Firm—McDermott, Will & Emery

[57] ABSTRACT

Provided is a liquid crystal display element in which a pair of substrates are provided; a plurality of scanning lines and signal lines are disposed in the form of a matrix on one transparent substrate out of the substrates, so that domains between the transparent substrates are divided into plural picture element domains by the respective scanning lines and the respective signal lines; plural opposed lines are disposed on the other transparent substrate parallel to the scanning lines; and a pair of an alignment-controlling material layer and a liquid crystal composition layer are laminated between the respective picture element domains, wherein the respective scanning electrodes and opposed electrodes on a pair of the transparent substrates in the respective picture element domains are disposed in zigzag and have a structure in which they are not superposed on each other in a normal direction of the substrates.

11 Claims, 5 Drawing Sheets

PLAN VIEW OF PICTURE ELEMENT

CROSS SECTION OF PICTURE ELEMENT

ARROWS SHOW THE DIRECTION OF THE LIQUID CRYSTALS IN APPLYING VOLTAGE

LCD WITH ZIG-ZAG ELECTRODES ON BOTH SUBSTRATES

BACKGROUND OF THE INVENTION

1. Field of the Invention

The present invention relates to a liquid crystal display device, specifically to a liquid crystal display device of a projection type or a reflection type using no polarizing plates.

2. Description of the Related Art

Well known as conventional liquid crystal display devices are a twist nematic (TN) mode making use of an optical activity, birefringence control (ECB) mode making use of an optical coherence and a super twist nematic (STN) mode. Any mode requires one or two polarizing plates, and this provides the defects that the satisfactory contrasts and viewing angles can not be obtained and the response speeds are slow. A liquid crystal display device having an alternate electrode for the purpose of improving a viewing angle is reported in SID International Symposium Digest of Technical Papers, vol. XXIX, p. 718, (1998). This liquid crystal display device has the defect that the response speed is slow while the viewing angle is wide. Further, a liquid crystal display device having a zigzag electrode is reported in IDW Proceedings of The Fourth International Display Workshops, p. 175, (1997). This liquid crystal display device has a wide viewing angle and a quick response speed but has the defects that the brightness is low and the driving voltage is high.

Either of the birefringence control (ECB) mode and the super twist nematic (STN) mode has had the defect that they have a low contrast and a slow response speed and therefore are unsuitable for animation display. A twist nematic (TN) mode has had the difficulty that the response speed is quick but the viewing angle is very narrow. Either of the twist nematic (TN) mode, the birefringence control (ECB) mode and the super twist nematic (STN) mode requires one or two polarizing plates, and therefore a part of transmitted light or reflected light is absorbed by the polarizing plates. Accordingly, a reduction in the brightness of the display device is brought about, and the contrast thereof is reduced as well. The back light has been strengthened in order to supplement the brightness, which in turn has increased the power consumption. Further, since the birefringence control (ECB) mode and the super twist nematic (STN) mode are colored by birefringence, an optical compensating film is required, and this has been a factor for an increase in the cost in addition to a difficulty in the optical design.

SUMMARY OF THE INVENTION

A first object of the present invention is to provide a liquid crystal display device which achieves a high contrast, a high-speed response and a wide viewing angle making use of a refraction or diffraction phenomenon. A second of object of the present invention is to provide a liquid crystal display device which achieves a high brightness by decreasing polarizing plates.

As shown in FIG. 1, the first invention of the present invention relates to a liquid crystal display element in which a pair of substrates are provided; a plurality of scanning lines and signal lines are disposed in the form of a matrix on one transparent substrate out of the substrates, so that domains between the transparent substrates are divided into plural picture element domains by the respective scanning lines and the respective signal lines; plural opposed lines are disposed on the other transparent substrate parallel to the scanning lines; and a pair of an alignment-controlling material layer and a liquid crystal composition layer are laminated between the respective picture element domains, wherein the respective scanning electrodes and opposed electrodes on a pair of the transparent substrates in the respective picture element domains are disposed in zigzag and have a structure in which they are not superposed on each other in a normal direction of the substrates.

As shown in FIG. 2, the second invention of the present invention relates to a liquid crystal display element in which one polarizing plate is disposed in the liquid crystal display element as described in the first invention.

As shown in FIG. 3, the third invention of the present invention relates to a liquid crystal display element in which one polarizing plate and one quarter wave plate are disposed together in the liquid crystal display element as described in the first invention.

As shown in FIG. 4, the fourth invention of the present invention relates to a liquid crystal display element in which the liquid crystal display element as described in the first invention is disposed so that it is superposed between two polarizing plates.

As shown in FIG. 5, the fifth invention of the present invention relates to a liquid crystal display element in which the liquid crystal display element as described in the first invention is disposed in a structure in which a reflection plate is disposed on an opposite side to one polarizing plate.

The sixth invention of the present invention relates to the liquid crystal display element as described in the fourth invention, wherein two polarizing plates are disposed in a mode of linearly polarized light and parallel nicol.

The seventh invention of the present invention relates to the liquid crystal display element as described in the fourth invention, wherein two polarizing plates are disposed in a mode of linearly polarized light and cross nicol.

The eighth invention of the present invention relates to the liquid crystal display element as described in any of the first to fifth inventions, wherein zigzags in the respective scanning electrodes and opposed electrodes in the respective picture element domains have an angle ($\theta$) of 60° to 120°.

The ninth invention of the present invention relates to the liquid crystal display element as described in any of the first to fifth inventions, wherein the respective scanning electrodes and opposed electrodes in the respective picture element domains have independently a width (W) of 5 to 35 $\mu$m.

The tenth invention of the present invention relates to the liquid crystal display element as described in any of the first to fifth inventions, wherein spaces (L) between the respective scanning electrodes or between the respective opposed electrodes in the respective picture element domains are independently 20 to 200 $\mu$m.

The eleventh invention of the present invention relates to the liquid crystal display element as described in any of the first to fifth inventions, wherein the liquid crystal composition has a thickness (D) of 3 to 30 $\mu$m.

The liquid crystal display device of the present invention is constituted as shown in FIG. 1. A pair of glass substrates (1) are provided; a plurality of scanning electrodes (5) and signal electrodes (6) are disposed in the form of a matrix on one transparent substrate (2) out of the substrates, so that domains between the transparent substrates are divided into plural picture element domains by the respective scanning lines and the respective signal lines; plural opposed lines (7)

are disposed on the other transparent substrate (2) parallel to the scanning electrodes; and a pair of an alignment-controlling material layer (3) and a liquid crystal composition layer (4) are laminated between the respective picture domains. A plan view and a cross section of this one picture element are shown in FIG. 6. The scanning electrodes themselves and the opposed electrodes themselves are disposed in the electrode space (L) so that the scanning lines and the opposed lines in the respective picture element domains having the electrode width (W) are not superposed. When signals are applied to the respective scanning lines and the respective signal lines, the signals having different potential differences are applied to a pair of the signal lines belonging to the respective picture element domains whenever scanning signals are applied to the respective scanning lines. If the signals having different potential differences are applied to the respective signal lines, an electric field according to this potential difference acts on the liquid crystals in the respective picture element domains, and the liquid crystal molecules rise at a certain elevation angle toward the transparent substrate surface. This can control an alignment of the liquid crystals in the respective picture element domains as shown in FIG. 7. In this case, the liquid crystal composition is aligned obliquely toward the substrate, and therefore a refraction or diffraction phenomenon is caused, so that the propagation path of light can be controlled.

Figure 1:
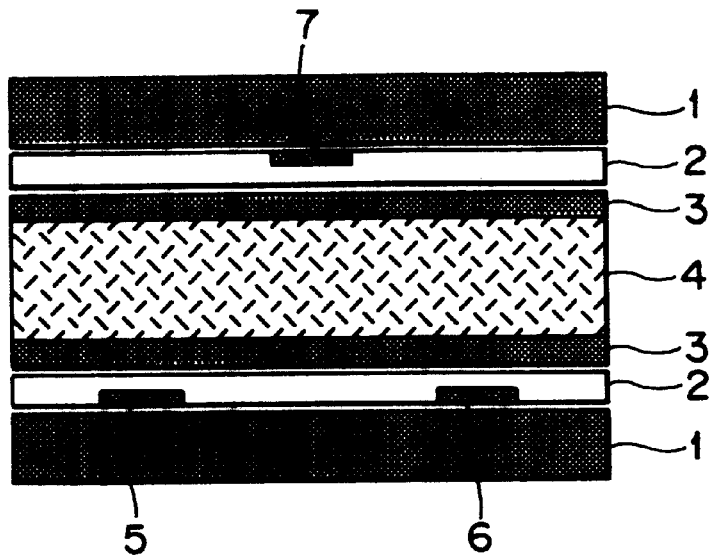
FIG. 1 is an explanatory drawing of the display device as described in claim 1.

Explanation of Signs:
1 Glass substrate
2 Transparent substrate
3 Alignment-controlling material layer
4 Liquid crystal composition layer
5 Scanning electrode
6 Signal electrode
7 Opposed electrode
8 Polarizing plate
9 Quarter wave plate
10 Reflection plate

EMBODIMENT OF THE INVENTION

The optical configuration of the present invention includes roughly three configurations. The first one includes a diffraction configuration using no polarizing plate, wherein outgoing light is taken out by making use of an optical diffraction effect brought by liquid crystal molecules induced in an electric field by projecting random light. The second one includes a circular polarization configuration in which one polarizing plate and one quarter wave plate are disposed together, wherein outgoing light is taken out by making use of an optical diffraction effect brought by liquid crystal molecules induced in an electric field by projecting circularly polarized light. The third one includes a linear polarization configuration using one or two polarizing plates. The incident direction of linearly polarized light includes a mode in which the light-propagating axis direction of linearly polarized light is allowed to be consistent (parallel incidence) or cross (vertical incidence) with a liquid crystal alignment direction on the glass substrate of the incidence side.

Figure 7:
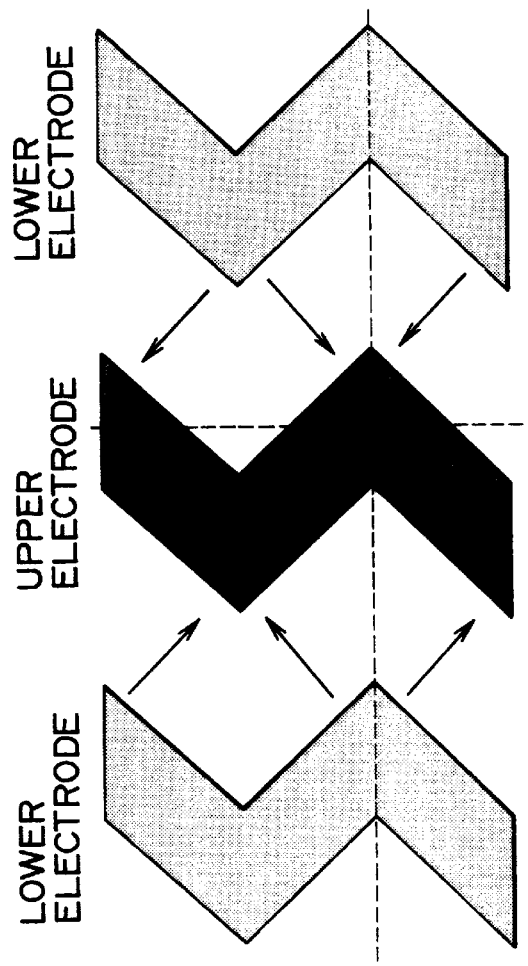
FIG. 7 is an explanatory drawing of the liquid crystal molecules in applying voltage.
Figure 7:
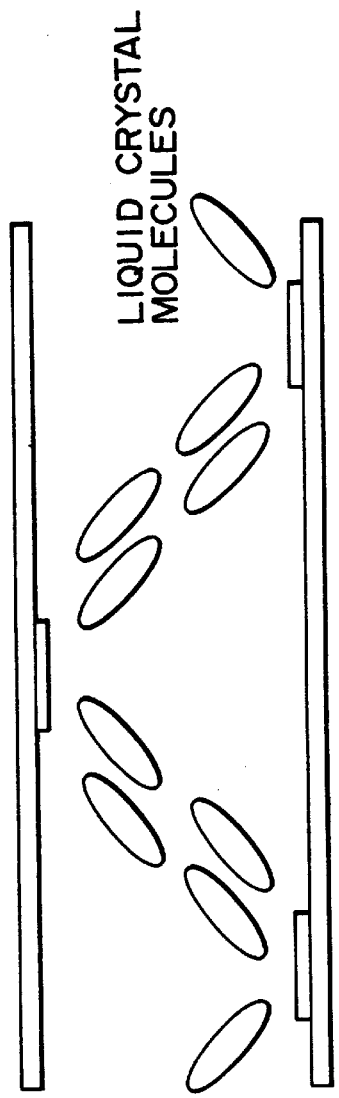

Further, the configuration of the polarizing plate is distinguished into one polarizing plate configuration in which a diffraction effect brought by extraordinary light of incident light is induced and two polarizing plate configuration in which the diffraction effect brought by extraordinary light of incident light is induced and in addition thereto, ordinary light of outgoing light is intercepted. If alignment of the liquid crystal composition layer is either of anti-parallel (AP) alignment and twist nematic (TN) alignment, the refraction phenomenon is predominant in the case of parallel incidence, and a diffraction phenomenon is predominant in the case of vertical incidence. For example, when incident light is projected parallel and the alignment of the liquid crystal is TN alignment in the linear polarization configuration using two polarizing plates, light is turned first into light of a certain polarizing axis in the polarizing plate on the incident light side in applying no voltage. The polarizing axis of the incident light is consistent with the aligning axis of the liquid crystal on the incidence side, and therefore the light is transmitted. Because of the TN alignment, the polarizing axis is twisted by 90° along the liquid crystal molecules and passes through the cell to reach the polarizing plate on the opposite side. In this case, if the two polarizing plates are disposed in the mode of parallel nicol, the polarizing axis of the outgoing light is deviated by 90° from the polarizing axis of the polarizing plate on the outgoing light side, and therefore the outgoing light is not transmitted, so that a normally black mode is obtained. In contrast with this, if two polarizing plates are disposed in the mode of cross nicol, the polarizing axis of the outgoing light is consistent with the polarizing axis of the polarizing plate on the outgoing light side, and therefore the outgoing light passes through the polarizing plates, so that a normally white mode is obtained. For example, if voltage is applied in the normally white mode, the liquid crystal starts rising, and light refraction can be observed as liquid crystal alignment is deformed. The refraction angle of the outgoing light grows large gradually according to a rise in the voltage. As shown in FIG. 7, when the liquid crystal is obliquely aligned at about 45°, the refraction angle is maximized.

When the alignment of the liquid crystal is the AP alignment, the contrast is good in the case of one or two polarizing plates and parallel nicol. When the alignment is the TN alignment, the contrast is good in the case of one or two polarizing plates and cross nicol.

In conventional modes, the use of one or two polarizing plates has notably reduced the contrast. However, if the method of the present invention is used, the high contrast can be achieved even if one or two polarizing plates as well as no polarizing plates are used.

The zigzags in the respective scanning electrodes and opposed electrodes in the respective picture element domains have preferably an angle (θ) of 60° to 120°. The zigzags in the respective scanning electrodes and opposed electrodes in the respective picture element domains have more preferably an angle (θ) of 80° to 100°. In particular, when the zigzags in the respective scanning electrodes and opposed electrodes have an angle (θ) of 90°, the strength of the refraction light is maximized.

Preferably, the respective scanning electrodes and opposed electrodes in the respective picture element domains have independently a width (W) of 5 to 35 μm. More preferably, the respective scanning electrodes and opposed electrodes in the respective picture element domains have independently a width (W) of 10 to 25 μm. If the electrodes have a width of less than 5 μm, the electric field is not produced well, and the liquid crystal molecules are not aligned well. Accordingly, it is not preferred. On the other hand, if the electrodes have a width of larger than 35 μm, the aperture rate is markedly reduced. Accordingly, it is not preferred as well.

Preferably, the spaces (L) between the respective scanning electrodes or between the respective opposed electrodes in the respective picture element domains are independently 20 to 200 μm. More preferably, the spaces (L) between the respective scanning electrodes or between the respective opposed electrodes in the respective picture element domains are independently 40 to 150 μm. If the space between the electrodes is less than 20 μm, the aperture rate is markedly reduced, and therefore it is not preferred. On the other hand, if the space between the electrodes is larger than 200 μm, the liquid crystal molecules do not rise sufficiently well when voltage is applied, and therefore it is not preferred as well.

The liquid crystal composition has preferably a thickness (D) of 3 to 30 μm. The liquid crystal composition has more preferably a thickness (D) of 3 to 25 μm. If the liquid crystal composition has a thickness of less than 3 μm, it is difficult to control the cell gap, and the yield is notably degraded. Accordingly, it is not preferred. On the other hand, if the liquid crystal composition has a thickness of larger than 30 μm, the liquid crystal molecules do not rise sufficiently well when voltage is applied, and therefore it is not preferred as well.

The liquid crystal may have either positive or negative dielectric anisotropy ($\Delta \epsilon$) from the viewpoint of the fundamental purpose of obtaining an oblique aligning state of 45° after applying voltage, and the initial aligning state may be any of homogeneous alignment, TN alignment and homeotropic alignment. Preferred as the alignment-controlling material are a polyimide type aligning film, a soluble polyimide type aligning film and a polyamic acid type aligning film. Further, the alignment-controlling material layer on which metals and $SiO_2$ are deposited can be used without having any problems. In the homogeneous alignment and the homeotropic alignment, either one or both of refraction and diffraction take place depending on the conditions. Refracted light and diffracted light can properly be used by the presence of a polarizing plate, the kind of alignment and changing the polarizing direction of incident light.

Action:

According to the means described above, when signals are applied to the respective scanning lines and the respective signal lines according to image informations, the signals having different potential differences are applied to a pair of the signal wirings belonging to the respective picture element domains whenever the scanning signals are applied to the respective scanning lines. If the signals having different potential differences are applied to the respective signal lines, an electric field according to this potential difference acts on the liquid crystals in the respective picture element domains, and the liquid crystal molecules rise at a certain elevation angle toward the transparent substrate surface. This can control alignment of the liquid crystals in the respective picture element domains as shown in FIG. 7. In this case, the liquid crystal composition is aligned obliquely toward the substrate, and therefore a refraction or diffraction phenomenon is caused, so that the propagation path of light can be controlled.

EXAMPLES

The examples of the present invention shall be explained below based on drawings.

Example 1

Figure 2:
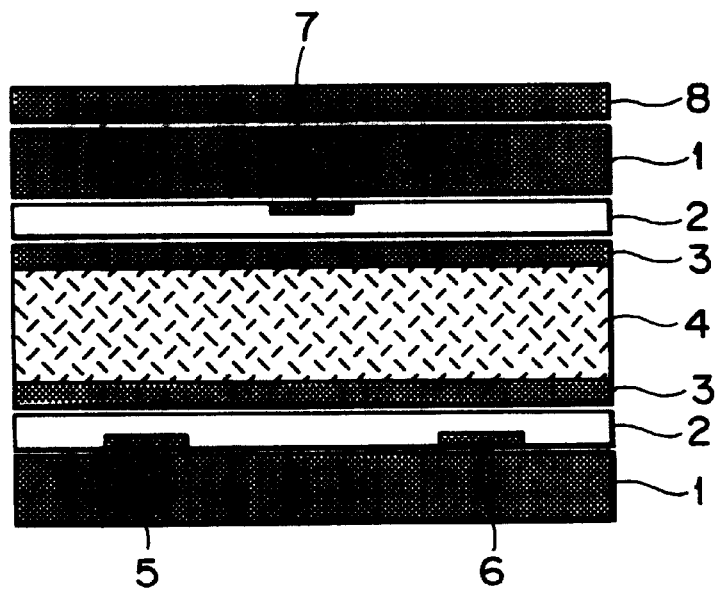
FIG. 2 is an explanatory drawing of the display device as described in claim 2.
Figure 3:
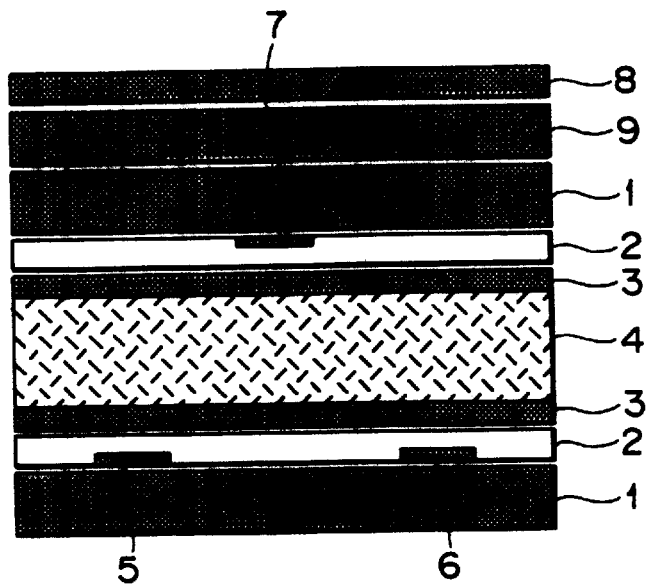
FIG. 3 is an explanatory drawing of the display device as described in claim 3.
Figure 4:
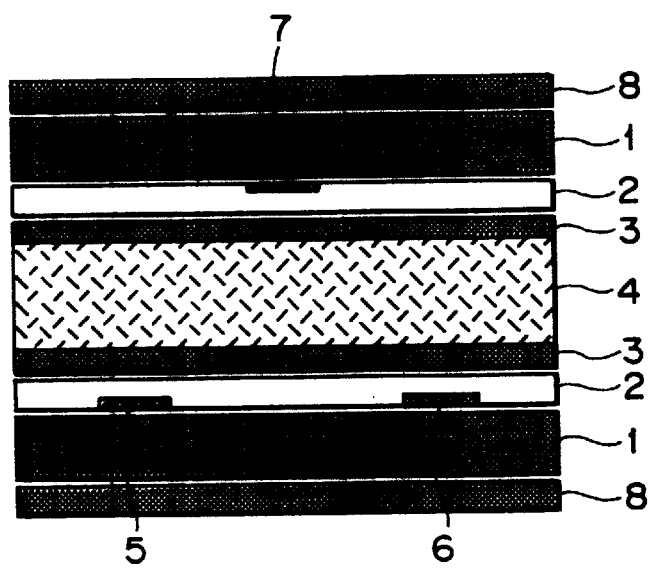
FIG. 4 is an explanatory drawing of the display device as described in claim 4.

The aligning film was of TN alignment and did not use a polarization plate. The structure thereof is shown in FIG. 2. Controlled were the electrode width (W) to 15 μm, the electrode space (L) to 55 μm, the cell thickness (D) to 25 μm and the angle (θ) of zigzags in the electrodes to 90°. Used was a liquid crystal composition having a clearing point of 103° C., an optical anisotropy (Δn) of 0.219 and a dielectric anisotropy ($\Delta \epsilon$) of 29.1, and PSI-G-4001 (manufactured by Cisso Corporation, pretilt angle: 4°) was used for the aligning film. In measuring the voltage-transmittance, an He—Ne laser was used for the light source, and a photodiode, a linear amplifier and a digital multimeter (ADVANTEST, R6451A) were used for the detector to apply a square wave of 1 KHz by means of an optional wave form generator (HP, 33120A). A threshold voltage (V90) was set at a point showing a transmittance of 90% in a normally white mode. The threshold voltage (V90) was 1.38 V, and the contrast ratio was 40:1.

Example 2

Figure 5:
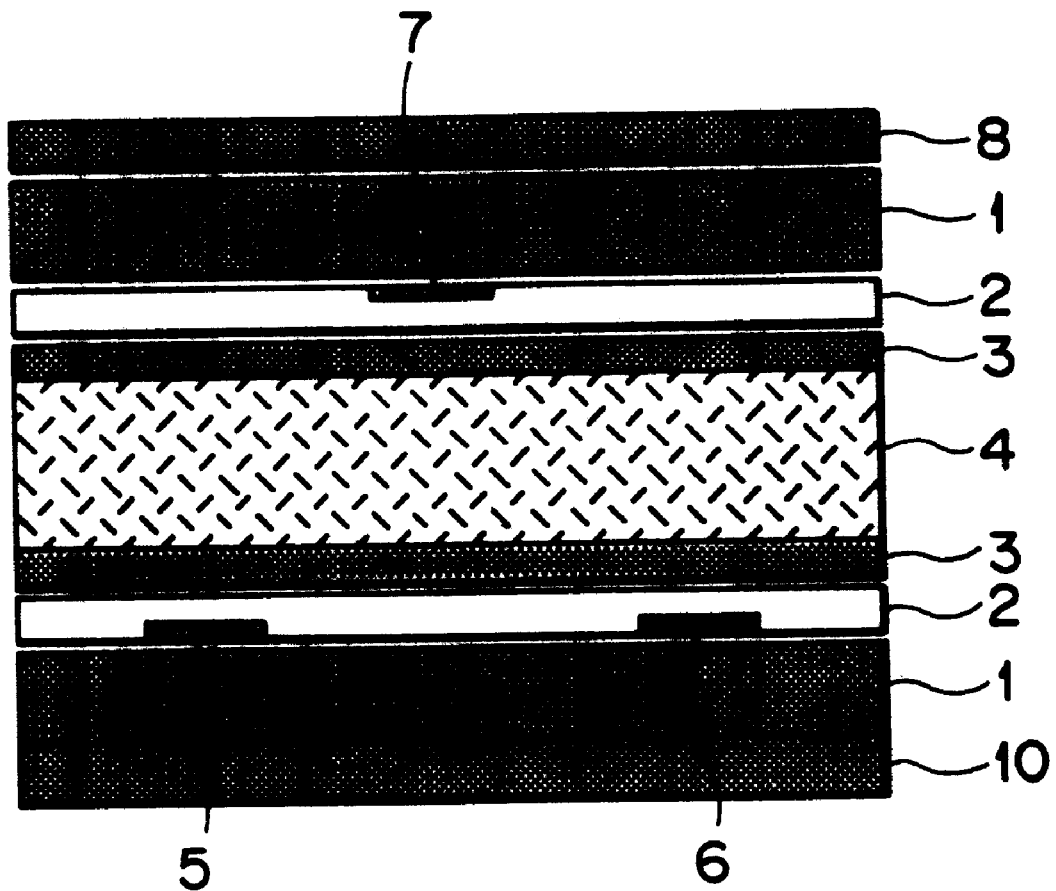
FIG. 5 is an explanatory drawing of the display device as described in claim 11.
Figure 6:
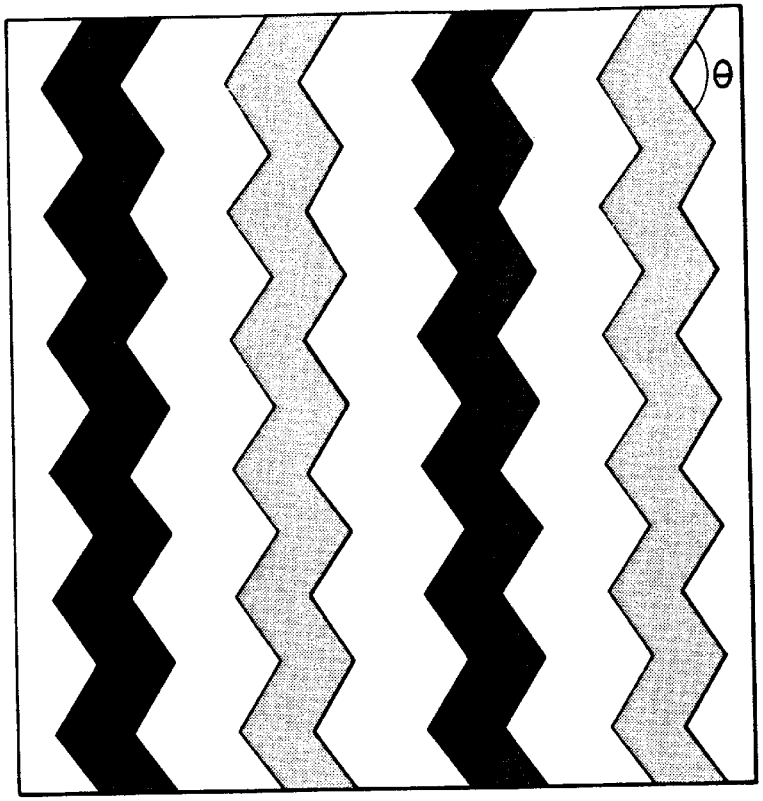
FIG. 6 is a plan view and a cross section of the picture element.
Figure 6:
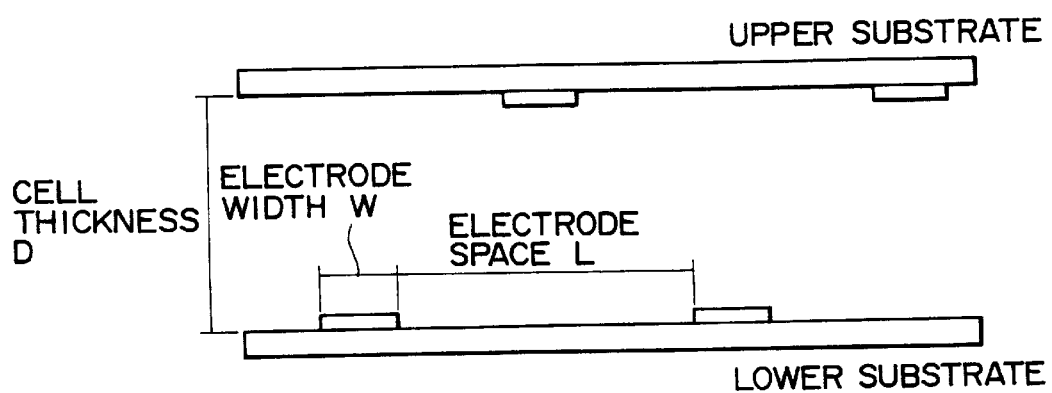

The same operation as in Example 1 was repeated, except that the aligning film was of anti-parallel alignment, and two polarizing plates were disposed in the mode of linearly polarized light and parallel nicol. The structure thereof is shown in FIG. 5. The threshold voltage (V90) was 1.02 V, and the contrast ratio was 462:1.

Example 3

The same operation as in Example 1 was repeated, except that the aligning film was of TN alignment, and two polarizing plates were disposed in the mode of linearly polarized light and cross nicol. The structure thereof is shown in FIG. 5. The threshold voltage (V90) was 2.10 V, and the contrast ratio was 168:1.

As described above in detail, the present invention provides a liquid crystal display device which achieves the high contrast, a high-speed response and a wide viewing angle making use of a refraction or diffraction phenomenon brought about by the alignment of the liquid crystal when the liquid crystal molecules in the respective picture element domains rise at a certain elevation angle toward the transparent substrate surface. Further, the present invention provides the liquid crystal display device which achieves a high brightness by decreasing polarizing plates.

What is claimed is:

1. A liquid crystal display element in which a pair of transparent substrates are provided; a plurality of scanning electrodes and signal electrodes are disposed in the form of a matrix on one transparent substrate out of the substrates, so that domains between the transparent substrates are divided into plural picture element domains by respective scanning electrodes and respective signal electrodes; plural opposed electrodes are disposed on the other transparent substrate parallel to the scanning electrodes; and a pair of an alignment-controlling material layer and a liquid crystal composition layer are laminated between respective picture element domains, wherein the respective scanning electrodes and opposed electrodes on said pair of the transparent substrates in the respective picture element domains are disposed in zigzag and have a structure in which they are not superposed on each other in a normal direction of the substrates.

2. A liquid crystal display element in which one polarizing plate is disposed in the liquid crystal display element as described in claim 1.

3. A liquid crystal display element in which one polarizing plate and one quarter wave plate are disposed together in the liquid crystal display element as described in claim 1.

4. A liquid crystal display element in which the liquid crystal display element as described in claim 1 is disposed so that it is superposed between two polarizing plates.

5. A liquid crystal display element in which the liquid crystal display element as described in claim 1 is disposed in a structure in which a reflection plate is disposed on an opposite side to one polarizing plate.

6. A liquid crystal display element as described in claim 4, wherein two polarizing plates are disposed in a mode of linearly polarized light and parallel nicol.

7. A liquid crystal display element as described in claim 4, wherein two polarizing plates are disposed in a mode of linearly polarized light and cross nicol.

8. A liquid crystal display element as described in any of claim 1, wherein the zigzags in the respective scanning electrodes and opposed electrodes in the respective picture element domains have an angle ($\theta$) of 60° to 120°.

9. The liquid crystal display element as described in any of claim 1, wherein the respective scanning electrodes and opposed electrodes in the respective picture element domains have independently a width (W) of 5 to 35 $\mu$m.

10. A liquid crystal display element as described in any of claim 1, wherein spaces (L) between the respective scanning electrodes or between the respective opposed electrodes in the respective picture element domains are independently 20 to 200 $\mu$m.

11. A liquid crystal display element as described in any of claim 1, wherein the liquid crystal composition has a thickness (D) of 3 to 25 $\mu$m.

* * * * *

UNITED STATES PATENT AND TRADEMARK OFFICE
CERTIFICATE OF CORRECTION

PATENT NO.    : 6,075,582  
DATED         : June 13, 2000  
INVENTOR(S)   : Hiroyoshi Onnagawa et al.

Page 1 of 1

It is certified that error appears in the above-identified patent and that said Letters Patent is hereby corrected as shown below:

Claim 8,  
Line 1, delete "any of";

Claim 9,  
Lines 1-2, delete "any of";

Claim 10,  
Line 1, delete "any of";

Claim 11,  
Line 1, delete "any of".

Signed and Sealed this

Nineteenth Day of February, 2002

Attest:

JAMES E. ROGAN  
*Director of the United States Patent and Trademark Office*

*Attesting Officer*